(12) United States Patent
Castelli (10) Patent No.: US 9,502,961 B2
(45) Date of Patent: Nov. 22, 2016

(54) CONTROL CIRCUIT IMPLEMENTING A RELATED METHOD FOR CONTROLLING A SWITCHING POWER FACTOR CORRECTOR, A PFC AND AN AC/DC CONVERTER

(71) Applicant: STMICROELECTRONICS S.R.L., Agrate Brianza (IT)

(72) Inventor: Claudia Castelli, Brugherio (IT)

(73) Assignee: STMicroelectonics S.r.l., Agrate Brianza (IT)

( * ) Notice: Subject to any disclaimer, the term of this patent is extended or adjusted under 35 U.S.C. 154(b) by 16 days.

(21) Appl. No.: 14/734,680

(22) Filed: Jun. 9, 2015

(65) Prior Publication Data

US 2016/0020692 A1  Jan. 21, 2016

(30) Foreign Application Priority Data

Jul. 15, 2014  (IT) ............... MI2014A1282

(51) Int. Cl.
| | | |
|---|---|---|
| G05F 1/61 | (2006.01) | |
| H02M 1/42 | (2007.01) | |
| H02M 1/00 | (2006.01) | |

(52) U.S. Cl.
CPC ............. *H02M 1/4208* (2013.01); *G05F 1/61* (2013.01); *H02M 1/4225* (2013.01); *H02M 2001/0054* (2013.01); *Y02B 70/126* (2013.01)

(58) Field of Classification Search
None
See application file for complete search history.

(56) References Cited

U.S. PATENT DOCUMENTS

| 5,003,454 A | * | 3/1991 | Bruning | .............. H02M 1/4225 323/222 |
|---|---|---|---|---|
| 8,749,212 B2 | | 6/2014 | Saint-Pierre | |
| 2008/0246444 A1 | * | 10/2008 | Shao | ................... H02M 1/4225 323/207 |
| 2010/0109626 A1 | | 5/2010 | Chen | |
| 2011/0019322 A1 | * | 1/2011 | Akama | ................... H02M 1/32 361/93.1 |
| 2012/0313646 A1 | * | 12/2012 | Nishikawa | .......... H02M 1/4225 324/415 |
| 2015/0043252 A1 | * | 2/2015 | Kuang | .............. H02M 3/33507 363/21.16 |
| 2015/0195878 A1 | * | 7/2015 | Garrity | .............. H05B 33/0821 315/186 |

OTHER PUBLICATIONS

Li, Q. et al., "Light Load Efficiency Improvement for PFC," IEEE Energy Conversion Congress and Exposition (ECCE 2009), San Jose, California, pp. 3755-3760, Sep. 20-24, 2009.
Application Note AN-52, HiperPFS™ Family, Power Integrations, 40 pages, Dec. 2011.
Application Note, V1.3, ICE1PCS01/02, Boost Type CCM PFC Design with ICE1PCS01/02, Infineon Technologies, Apr. 2007, 16 pages.
UCC28180 Programmable Frequency, Continuous Conduction Mode (CCM), Boost Power Factor Correction (PFC) Controller, Texas Instruments, Nov. 2013, revised Dec. 2014, 45 pages.

\* cited by examiner

*Primary Examiner* — Jeffrey Gblende
(74) *Attorney, Agent, or Firm* — Seed IP Law Group LLP (57) ABSTRACT

A control circuit controls a switching power factor corrector based on switch off-time modulation by controlling the input electric charge during on-time. The circuit includes a charge current generator that generates charge current as a replica of a current sense signal amplified with a gain corresponding to the square of peak value of a rectified input voltage, a loop capacitor charged with the charge current during on-time intervals and discharged with a discharge current during off-time intervals, a discharge current generator that generates the discharge current proportional to a product of a comparison voltage and a difference between a regulated output voltage and the rectified input voltage, and a PWM modulator that senses a charge voltage of the loop capacitor, turns on the switch for an on-time duration in response to detecting that the charge voltage nullifies, and turns off the switch when the on-time duration has elapsed.

21 Claims, 12 Drawing Sheets

CONTROL CIRCUIT IMPLEMENTING A RELATED METHOD FOR CONTROLLING A SWITCHING POWER FACTOR CORRECTOR, A PFC AND AN AC/DC CONVERTER

BACKGROUND

1. Technical Field

The present disclosure relates to power converter circuits, in particular to a control circuit implementing a related method for controlling a switching power factor corrector (PFC), a PFC and an AC/DC converter including the PFC.

2. Description of the Related Art

Many electronic devices, such as computers, TV sets, etc. or rechargeable batteries, use a DC voltage as supply voltage, thus the AC voltage made available by the mains is AC/DC converted. Especially in cases in which the power consumption of the supplied load is relatively great, a power factor correction is used to minimize reactive power and to maximize real power absorbed from the mains. In this case, an AC/DC converter that provides power factor correction includes a power factor corrector (PFC) and eventually a DC/DC converter in cascade to the PFC.

Figure 1:
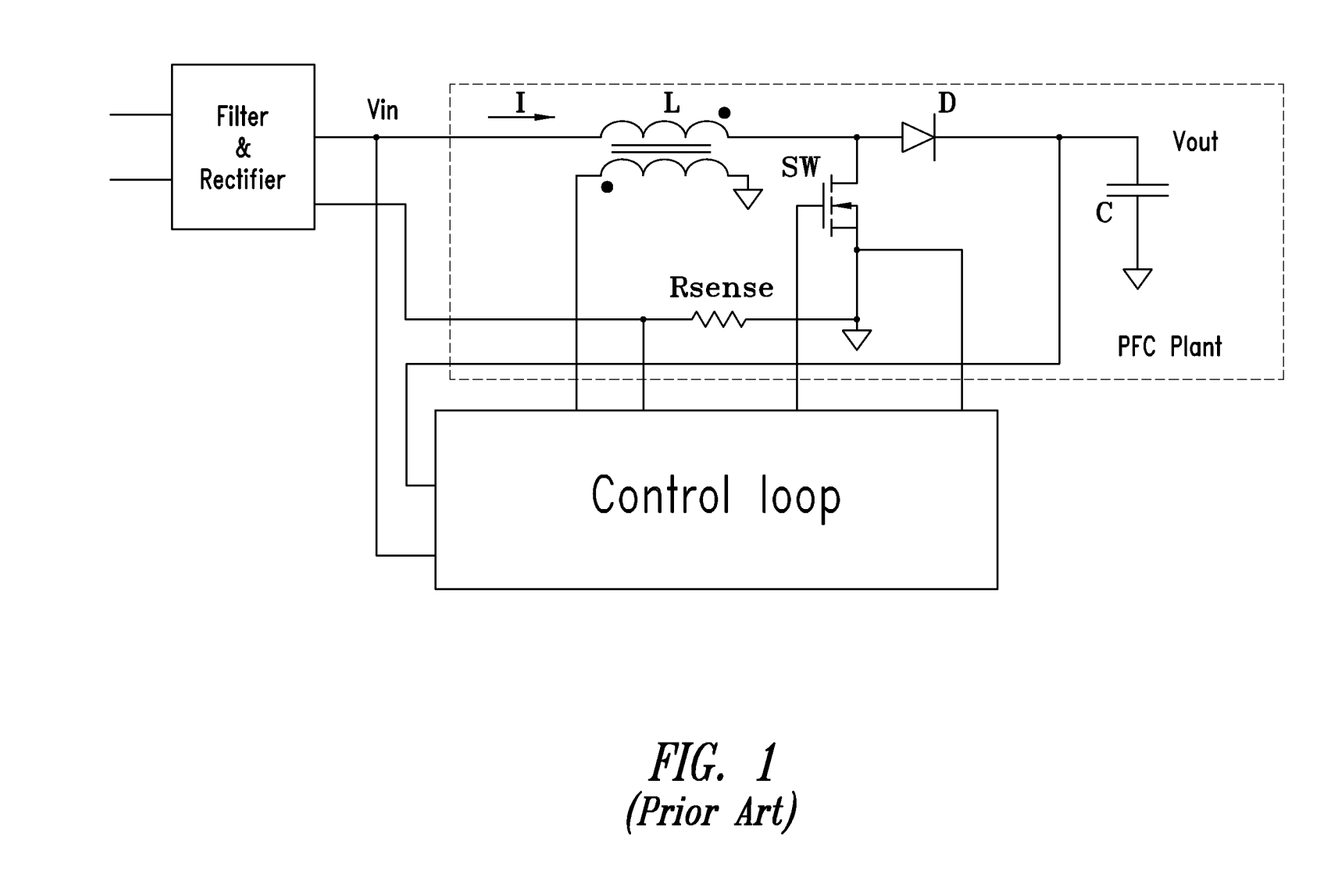
FIG. 1 depicts a PFC.
Figure 2:
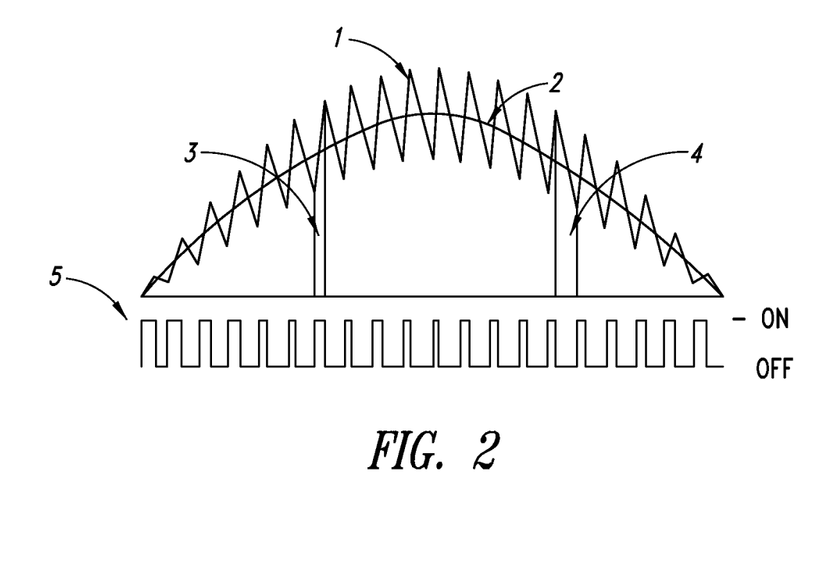
FIG. 2 are time graphs of the current I absorbed by the PFC core obtained in CCM condition of the PFC of FIG. 1.

A PFC of the type shown in FIG. 1 usually comprises a bridge rectifier that rectifies the mains voltage and generates a rectified input voltage Vin, a core PFC_PLANT that generates a DC output voltage Vout, and a control circuit CONTROL LOOP that senses the output voltage Vout, the rectified voltage Vin and the current flowing throughout the inductance and generates a control signal for turning on/off the power switch SW of the converter PFC_PLANT. The core PFC_PLANT may be controlled in continuous current mode (CCM) and the current absorbed from the mains is substantially sinusoidal and in phase with the mains voltage, as schematically shown by the exemplary time graphs of FIG. 2 of the current through the inductor (1), of the low-frequency component of the current through the inductor (2), of the current through the switch (3), of the current through the diode (4) and of the control signal of the switch SW (5), obtained through simulation of the PFC of FIG. 1. The most recent norms and International standards specify high efficiency and good power factor (PF) across the entire load range. An objective to be attained in this field is to define a novel PFC control methodology able to improve efficiency at light load conditions together with a low total harmonic distortion (THD) across the entire load range.

It is possible to control the PFC in CCM with an average current mode control with constant switching frequency. Such a control technique is well known in the art. The average current mode can be implemented by sensing the input voltage and generating a reference signal by means of multiplier circuit or without input line sensing. This second approach is used in the devices UCC28180 of Texas Instruments and ICE1PCS01 of Infineon, to the datasheets of which the skilled person is addressed for details. In both cases, a feedback control loop of a CCM PFC processes a sense signal Isense representative of the current flowing throughout the inductor L. One main feature of the average current-mode control is the presence of two control loops, the voltage loop and the current loop. Both of them require a proper compensation network.

The constant frequency average current mode control has also a very low efficiency at light load due to high switching losses. Besides, average current mode controllers present a non-linear characteristic at light load that increases harmonic distortion in discontinuous current mode (DCM) operation.

Another control technique is implemented in the devices PFS Hiper of the Power Integrations. In these devices the switching frequency is variable and the duration of the on-time and off-time are defined by means of a constant amp-seconds on-time control, and constant volt-seconds off-time control respectively. The skilled person is addressed to the datasheet of the above device for further details. A drawback of these devices is the very wide switching frequency variation with rms input voltage range and input voltage conduction angle. In particular, the switching frequency with high input voltage (230AC) when the line conduction angle is near to 90 degree is very low. Such a frequency profile is risky since it could introduce EMI input filter oscillations.

The article by Qian Li, Fred C. Lee, Ming Xu and Chuanyun Wang, "Light load efficiency improvement for PFC", Energy Conversion Congress and Exposition, 2009. ECCE 2009. IEEE, 20-24 Sep. 2009, pages 3755-3760, discloses a digital system for controlling CCM PFCs at light load conditions with an adaptive constant on-time control technique. Adaptive Constant on time has many attractive features as the automatic reduction of switching frequency, resulting improved light load efficiency. Anyway, the method described in this prior article suggests to calculate the off-time by means of a digital predictive method. Unfortunately, this algorithm is relatively complicated and a digital system (DSP microprocessor and fast A/D converter) is needed to sample the input voltage and the current through the inductor and to calculate the most appropriate duration of the next off-time. This solution is not very appealing because it increases overall costs of the PFC.

BRIEF SUMMARY

One embodiment of the present disclosure provides a power factor correction device for switching power supplies working in CCM which overcomes the above drawbacks and limitations. The proposed method allows to combine the advantages of adaptive on-time control with a simple, low-cost full analog circuit implementation.

This control loop is implemented by properly modulating the switch off-time while the on-time interval is predetermined by an independent ON-time generator circuit. In this methodology, it is the input electric charge during the switch ON-time that is controlled to obtain the desired input current shaping (power factor).

Thanks to present disclosure a very good input current shaping in all operation condition is achieved with single-loop architecture. The absence of external compensation components for the current loop stability results in a simpler design than that required by conventional two-loops controlled converters.

The proposed control schematic is also able to manage both CCM and DCM conditions without any discontinuities while granting high efficiency levels in all load conditions.

One embodiment of the present application is a method of controlling a switching power factor corrector that receives a rectified input voltage and provides a regulated output voltage. The method includes setting a duration of off-time interval of a power switch of the switching power factor corrector. The setting includes:

generating a charge current as a replica of a current sense signal, which is based on a current flowing through an inductor of the switching power factor corrector, amplified with a gain corresponding to the square of a peak value of the rectified input voltage;

charging a loop capacitor with the charge current during the on-time intervals and discharging the loop capacitor during the off-time intervals with a discharge current proportional to a product of a value of a comparison voltage and a difference between the regulated output voltage and the rectified input voltage;

turning on the power switch for an on-time duration in response to detecting that a charge voltage of the loop capacitor nullifies; and turning off the power switch when said on-time duration has elapsed.

The control circuit may be realized with analog components and determines off-times of the power switch by implementing the method. A PFC including the control circuit of the present disclosure and an AC/DC switching converter are also disclosed.

The claims as filed are integral part of this specification and are herein incorporated by reference.

DETAILED DESCRIPTION

Figure 3:
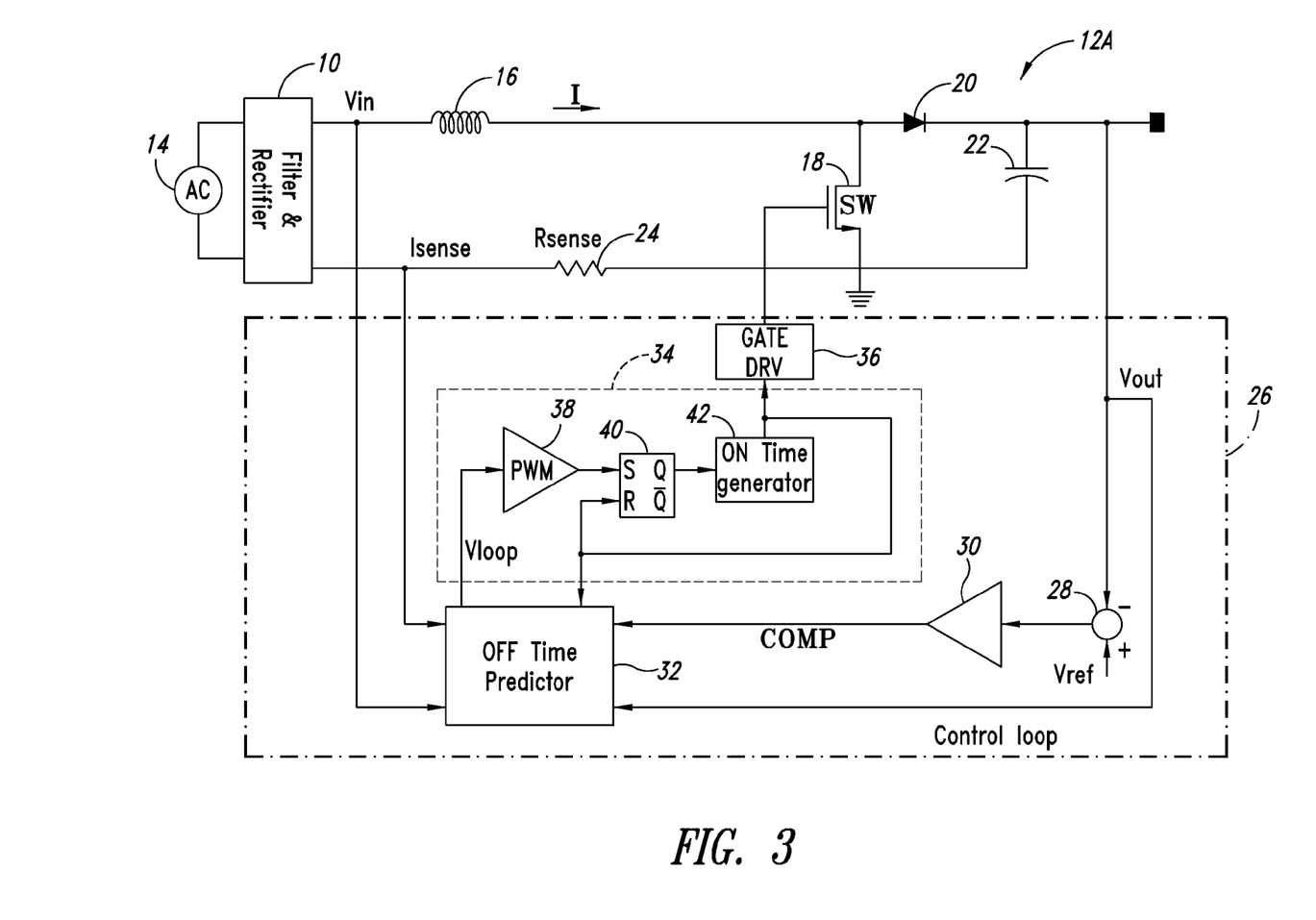
FIG. 3 depicts a PFC with a closed-loop control circuit CONTROL LOOP of the present disclosure.

An AC/DC switching converter, including a rectifier and filter circuit 10 and a PFC 12A according to an exemplary embodiment of this disclosure, is depicted in FIG. 3. The AC input voltage from the mains 14 is rectified and filtered by the rectifier and filter circuit 10, which includes a rectifying bridge and an input filter for obtaining a rectified input voltage Vin. The PFC 12A includes an inductor 16, a power switch 18, an output diode 20, an output capacitor 22, a sense resistor 24, and a closed-loop control circuit 26. The control loop 26 receives the output voltage Vout, the input voltage Vin and a current sense signal Isense, and provides a signal for turning on/off the switch 18. The current sense signal Isense represents the current flowing through the switch SW during on-time intervals and is generated with a sense resistor Rsense.

The control loop 26 includes a subtractor 28, configured to determine the difference between a reference voltage Vref and the output voltage Vout (or a feedback voltage representative of the output voltage Vout), and an error amplifier 30 that receives the difference from the subtractor 28 and generates an error voltage COMP proportional to the difference. The control loop 26 also includes an off time predictor 32, configured to set the duration of the off-time interval of the next switching cycle, a pulse width modulator (PWM) 34, and a gate driver 36 configured to control turn on and turn off of the power switch 18 based on control signals from the PWM 34. The OFF time predictor 32 receives the error voltage COMP, the input rectified voltage Vin, and the output voltage Vout and provides an analog voltage Vloop in input to a PWM zero-detection comparator 38 of the PWM 34. The PWM 34 further includes an SR flip-flop 40 and an ON time generator 42. When the analog voltage Vloop nullifies, the PWM comparator 38 triggers a pulse that sets the SR flip-flop 40 and causes the ON time generator to generate a PWM signal representing the duration of the ON-time of the next switching cycle. The PWM signal causes the gate driver 36 to turn on/off the switch 18 accordingly.

The equation governing a boost PFC based on the proposed modulation technique is derived by combining a boost inductor volt-second balance relation and an average current mode control equation. In order to understand the operating principle of OFF time predictor 32, for determining the duration of the off-time interval of the next switching cycle, let us consider the following equation:

$$\int_0^{Ton} I_{IN}(\vartheta) \cdot d\vartheta = K_m \int_{Ton}^{Tsw} V_{COMP} \cdot (V_{OUT} - V_{IN}(\vartheta)) \cdot d\vartheta$$

where θ is the line conduction angle.

This equation is derived by combining the boost inductor volt-second balance relation and the average current mode control equation. It defines a relationship between on-time and off-time that provides in CCM operation power factor correction (the input current is proportional to input voltage).

Figure 4:
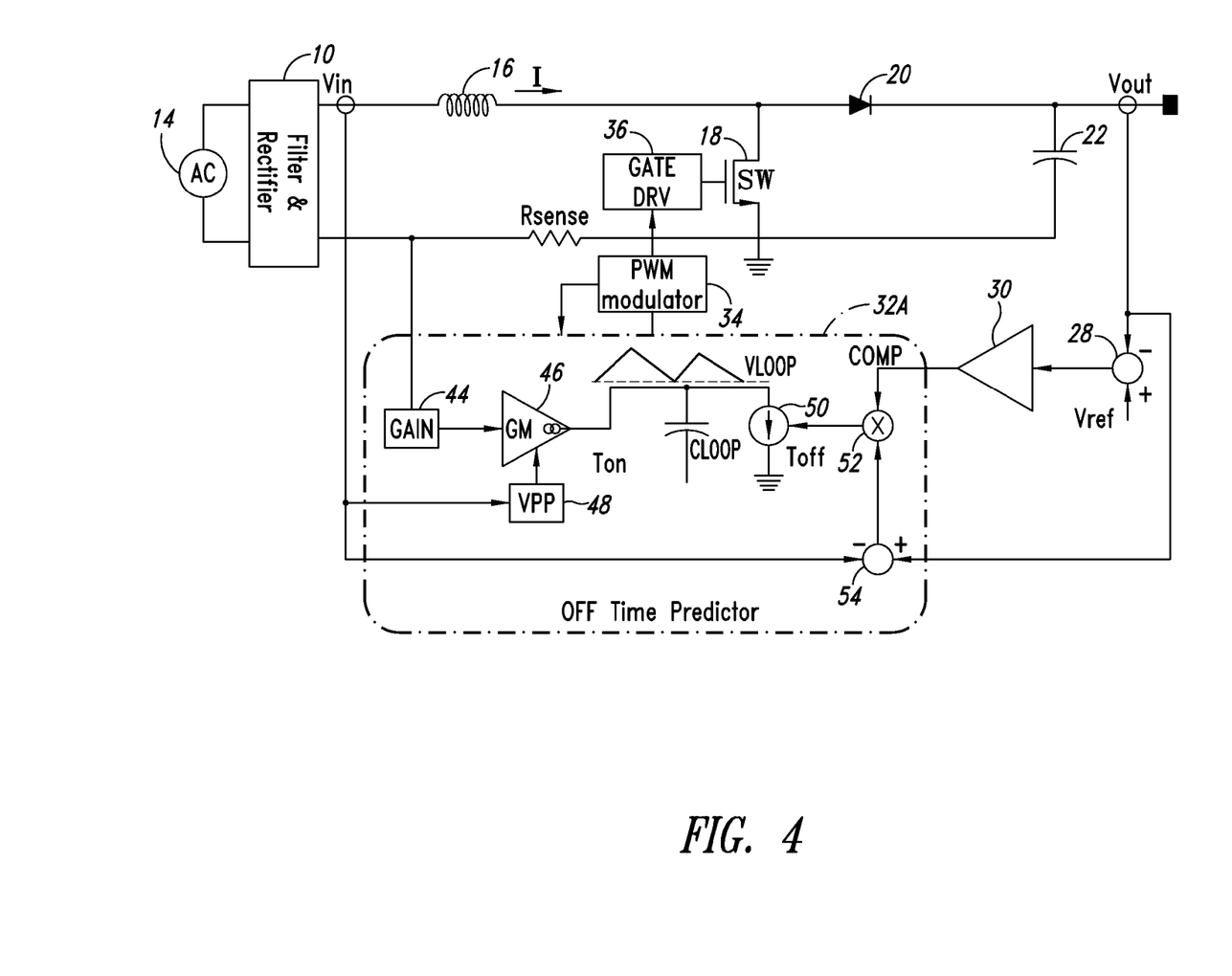
FIG. 4 shows an embodiment of a PFC with a closed-loop control circuit according to the present disclosure in which an exemplary diagram of a sub-circuit for determining the duration of the off-time interval of the next switching cycle.

As a result, starting from a predefined on-time, the switch off-time can be predicted cycle by cycle. A possible embodiment of this algorithm is a charge/discharge mechanism that comprises a capacitor integrating the sensed switch current during on-time and a current generator, active during off-time, sinking a current proportional to the product of the error amplifier voltage and the difference between the regulated output voltage and the rectified input voltage An integrated circuit implementation of a charge/discharge off-time predictor 32A, for implementing the off-time predictor 32 of FIG. 3, is illustrated in FIG. 4. The OFF time predictor 32A includes a gain block 44, a variable gain transconductance amplifier 46, and a peak detector (VPP) 48. According to a classic technique, the current sense signal Isense is amplified by the gain block 44, then is further amplified by the variable gain transconductance amplifier 46, whose GM is set by the peak detector 48 based on the detection of the peak voltage of the rectified input voltage Vin by the peak detector 48. The peak detector information is used to perform a feedforward action. As a result, the transconductance amplifier 46 acts as a charge current generator configured to generate a charge current as a replica of the current sense signal Isense, amplified with a gain GM proportional to the square value of the rectified input peak voltage $V_{PP}$.

The OFF time predictor 32A also includes a loop capacitor $C_{LOOP}$, a controlled current generator 50, a multiplier 52, and a subtractor 54. The loop capacitor $C_{LOOP}$ is charged by the charge current from the transconductance amplifier 46 during on-time intervals and its charge voltage is the analog voltage Vloop. The subtractor 54 receives the output voltage Vout and the rectified input voltage Vin and provides a difference signal representing the difference between the output voltage Vout and the rectified input voltage Vin. The multiplier 52 receives the difference signal from the subtractor 54 and the COMP signal from the error amplifier 30 and provides a product signal representative of the product of the difference signal and the COMP signal. During off-time intervals, the loop capacitor $C_{LOOP}$ is discharged by the controlled current generator 50, which draws a discharging current substantially determined by the product of the comparison voltage COMP and the difference signal. The PWM zero-detection comparator 38 of the PWM 34 determines the instant in which the voltage $V_{LOOP}$ nullifies and generates a triggering pulse that sets the end of the off time period by causing the SR flip-flop 40 and ON time generator 42 to cause the gate driver 36 to turn ON the switch 18 as discussed above with respect to FIG. 3. Turning ON the switch 18 causes the current sense signal Isense to rise again which causes the loop capacitor $C_{LOOP}$ to be charged again by the transconductance amplifier 46.

Therefore, the charge voltage $V_{LOOP}$ of the loop capacitor $C_{LOOP}$ represents the current flowing throughout the inductor L during a whole switching cycle.

The ON time generator 42, when triggered through the SR flip-flip 40 by the triggering pulse output by the PWM zero-detection comparator 38, generates a timing signal kept in a high logic state for a certain time interval (the duration of the on-time interval), and this timing signal enables the gate driver 36 that closes the switch 18.

Therefore, the duration of the off-time is not digitally calculated, but it is determined in analog form as the time for completely discharging the loop capacitor $C_{LOOP}$.

Figure 11:
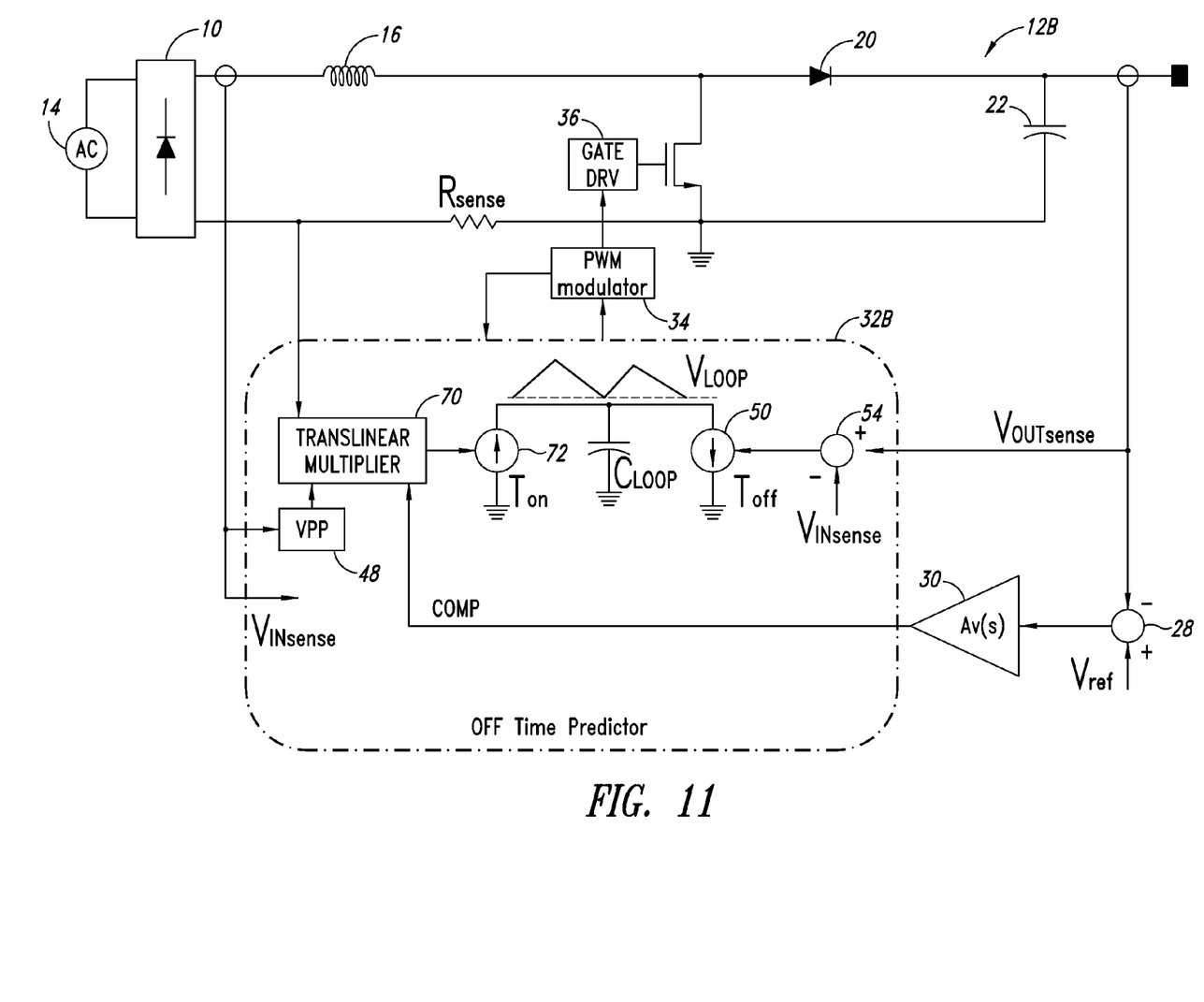
FIG. 11 shows another embodiment of a PFC with a closed-loop control circuit according to the present disclosure with a different implementation of charging and discharging currents for determining the duration of the off-time interval of the next switching cycle.
Figure 12:
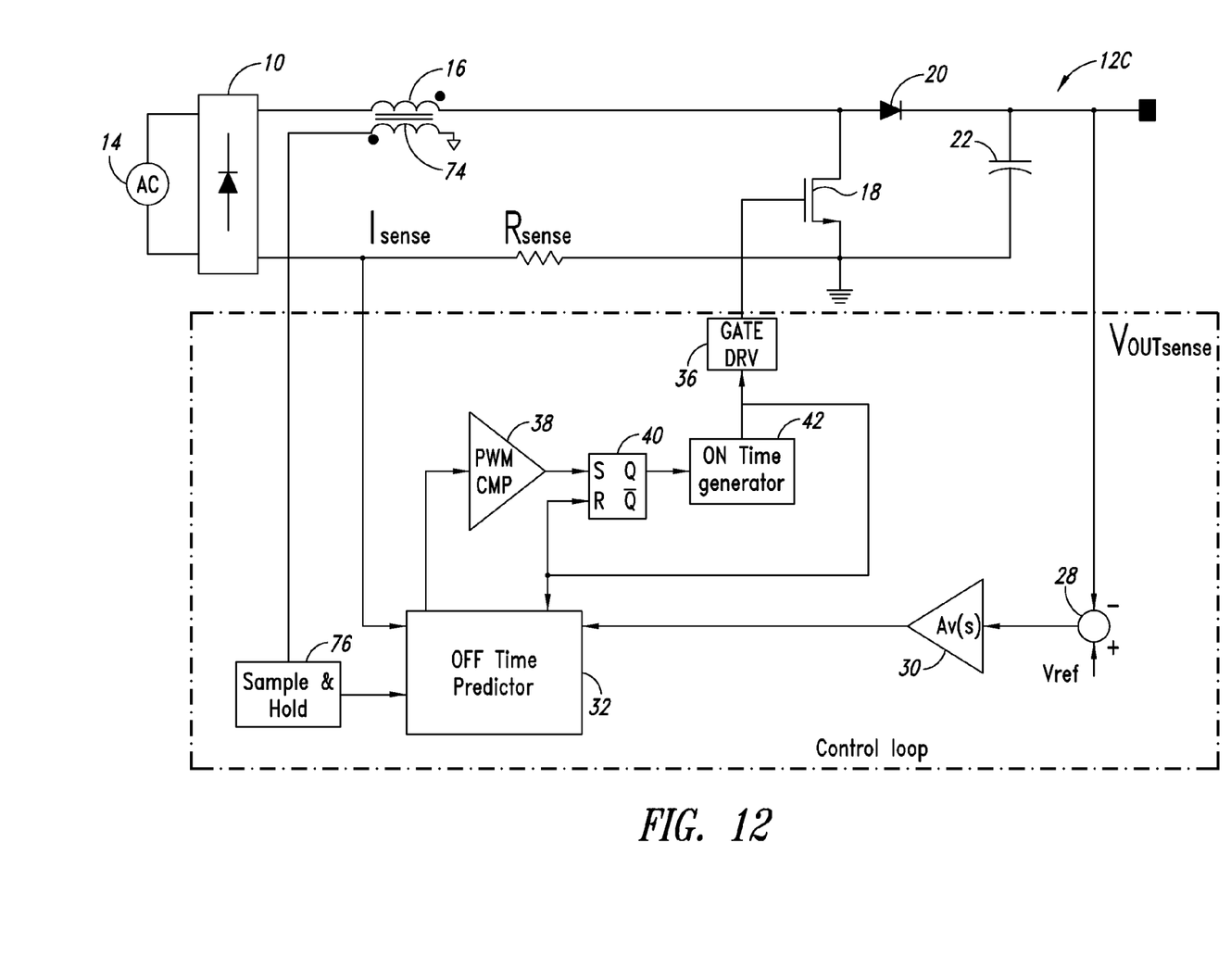
FIG. 12 shows a different embodiment of a PFC with a closed-loop control circuit according to the present disclosure where a current proportional to the difference between the regulated output voltage and the rectified input voltage is directly derived from an auxiliary winding in the boost inductor.

Different embodiments of the same concepts are represented in FIG. 11 and FIG. 12. FIG. 11 shows an AC/DC switching converter including the rectifier and filter circuit 10 and a PFC 12B according to another embodiment. The PFC 12B includes the same circuit elements as the PFC 12A of FIG. 4 (those same elements being indicated with the same reference numbers), except that the PFC 12B includes an OFF time predictor 32B according to a second embodiment, which provides a different implementation of charge and discharge currents. According to this implementation, the OFF time predictor 32B includes a translinear multiplier 70 having a first input connected to the sense resistor Rsense to receive the current sense signal Isense, a second input connected to the output of the peak detector (VPP) 48 to receive the peak value of the rectified input voltage, a third input connected to the output of the error amplifier 30 to receive the error voltage COMP, and an output connected to a control node of a controllable current source 72. The translinear multiplier 70 causes the current source 72 to provide the charging current during on time as a replica of the current sense signal Isense multiplied by the square of peak value of the rectified input voltage and divided by the error amplifier voltage according to the equation:

$$\frac{V_{PP}^2 K_P R_{sense} I_{IN}}{V_{COMP}}.$$

FIG. 12 shows the possibility to directly derive a current proportional to the difference between output voltage and input voltage from an auxiliary winding 74 of the boost inductor 16. In particular, FIG. 12 shows a PFC 12C according to another embodiment that is similar to the PFC 12A of FIG. 3 except that the PFC 12C includes a sample and hold circuit 76 that samples the current from the auxiliary winding 74 during OFF time periods.

Figure 5A:
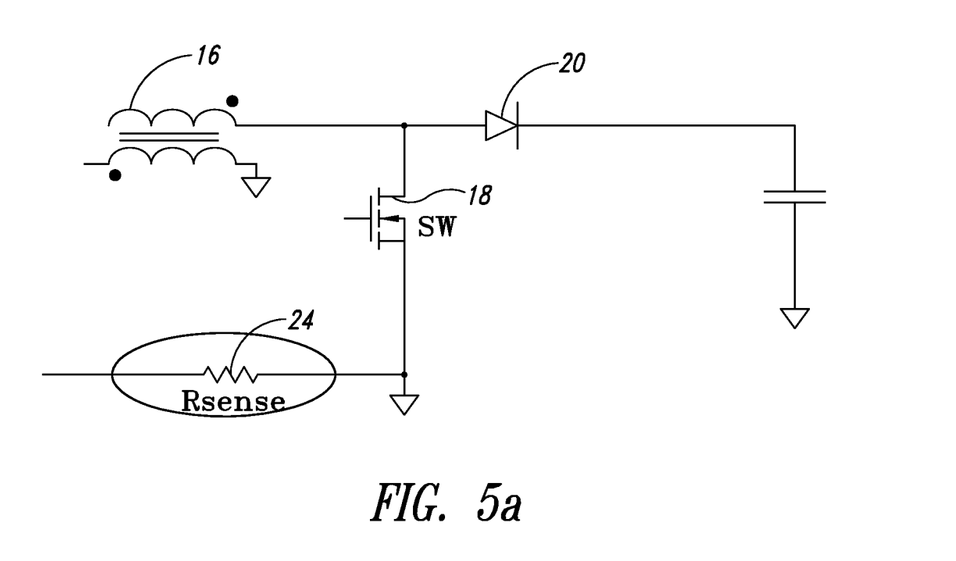
FIGS. 5a and 5b illustrate alternative ways of connecting a sense resistor Rsense to a power switch SW of a PFC according to an embodiment of this disclosure.
Figure 5B:
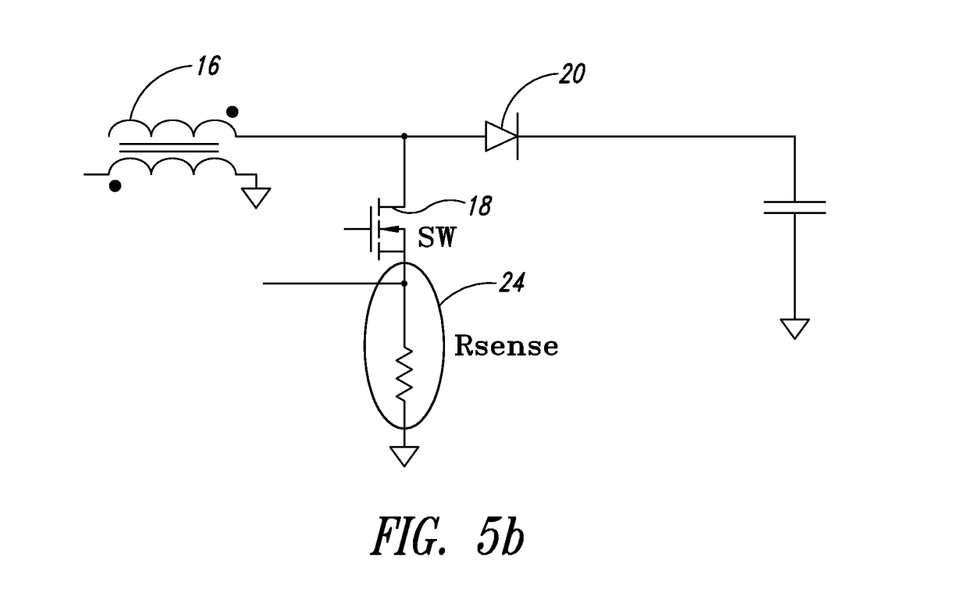

With this control technique, it is not necessary to monitor the current through the inductor 16 during a whole switching period, i.e., using a sense inductance magnetically coupled to the inductor 16, but it may be sufficient to sense the current only during the on-time, i.e., when the current flows through the power switch 18, with a sense resistor $R_{SENSE}$ coupled to the switch as shown in FIGS. 5a and 5b. This is a relevant advantage because it allows to reduce power dissipation on the sense resistor and to enhance further efficiency of the PFC. As an alternative, it is also possible to sense the current flowing throughout the switch using a sense FET integrated with the power MOSFET that constitutes the switch 18.

Figure 6:
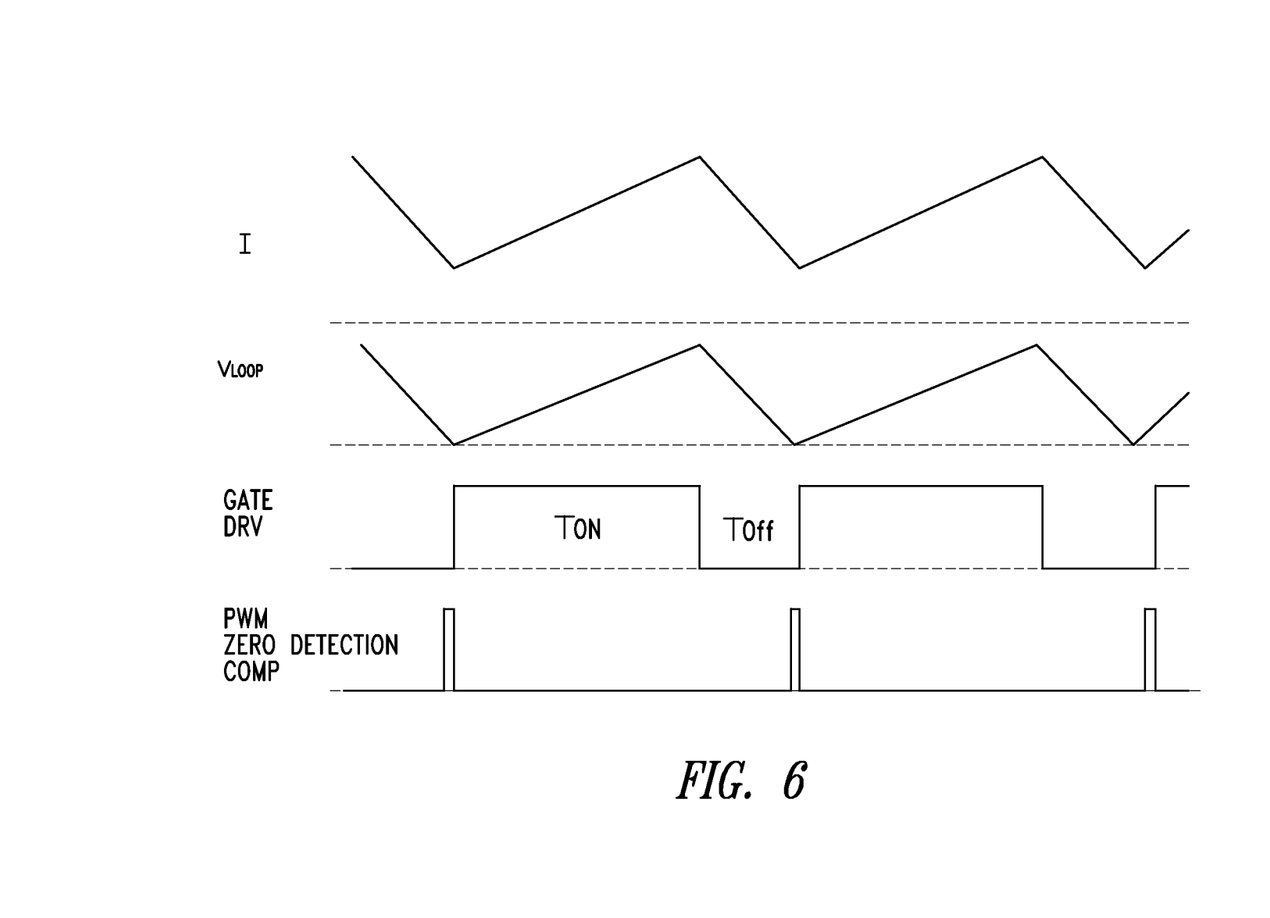
FIG. 6 depicts a time graph of the main signals of the PFC of FIG. 3 with the sub-circuit of FIG. 4 for determining the duration of the off-time interval of the next switching cycle.

The functioning of the PFC of FIG. 3 with the sub-circuit of FIG. 4 is illustrated referring to the time graphs depicted in FIG. 6. As explained above, the charge voltage $V_{LOOP}$ of the loop capacitor $C_{LOOP}$ substantially replicates the waveform of the current I flowing through the inductor. When the voltage $V_{LOOP}$ reaches zero, the PWM zero-detection comparator 38 triggers a pulse for setting the SR flip-flop 40. Therefore the ON time generator 42 is enabled and commands the gate driver 36 to turn on the switch 18. When a duration of the on-time interval (Ton) has elapsed, the ON time generator 42 resets the SR flip-flop 40, commands the gate driver 36 to turn off (Toff) the switch 18 and makes the OFF time predictor 32 discharge the loop capacitor $C_{LOOP}$ until the voltage $V_{LOOP}$ nullifies.

Figure 7:
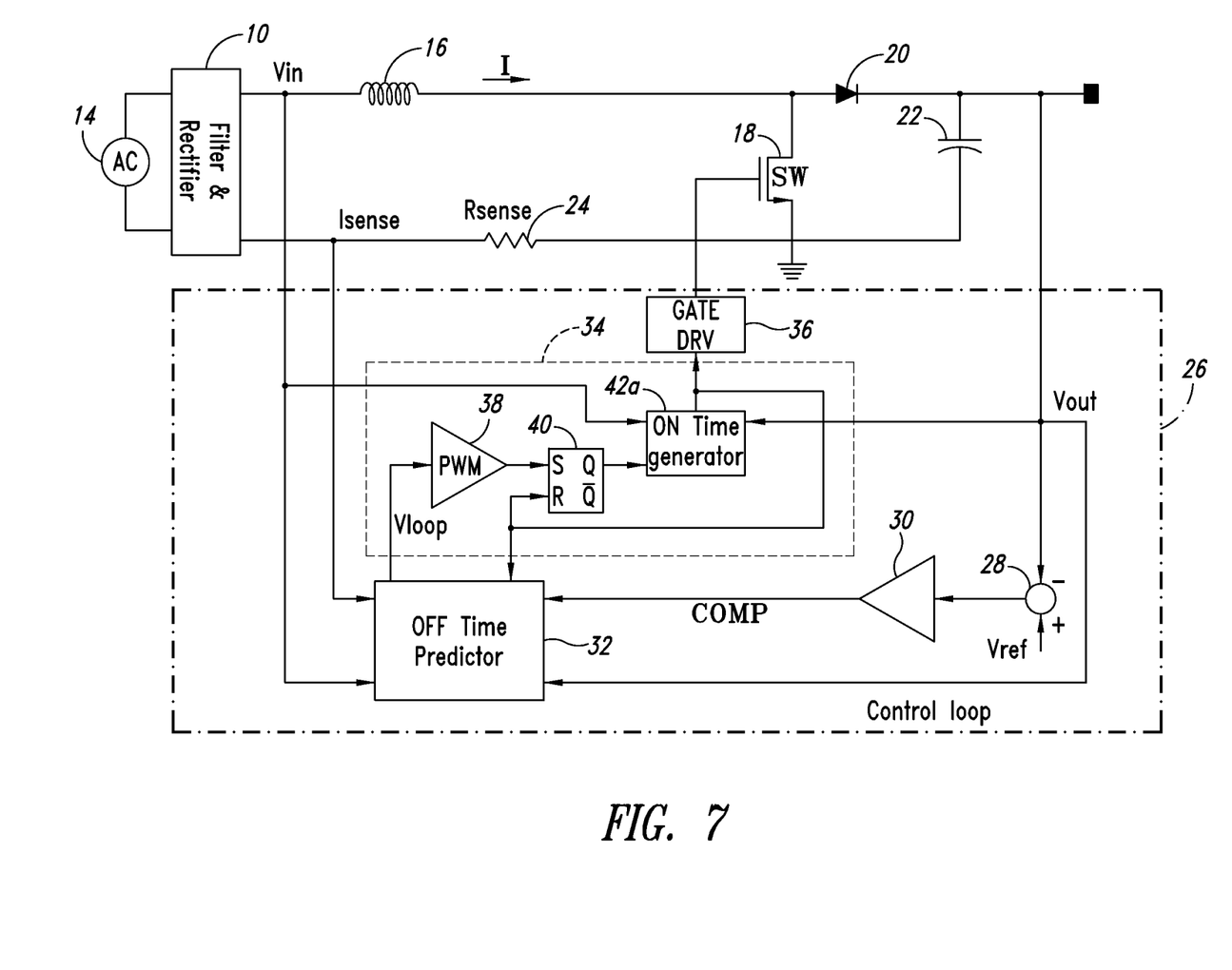
FIG. 7 shows another embodiment of a PFC with a closed-loop control circuit according to the present disclosure in which the values of the sensed output voltage and of the sensed input voltage are taken into account for determining the duration of the on-time interval.
Figure 8:
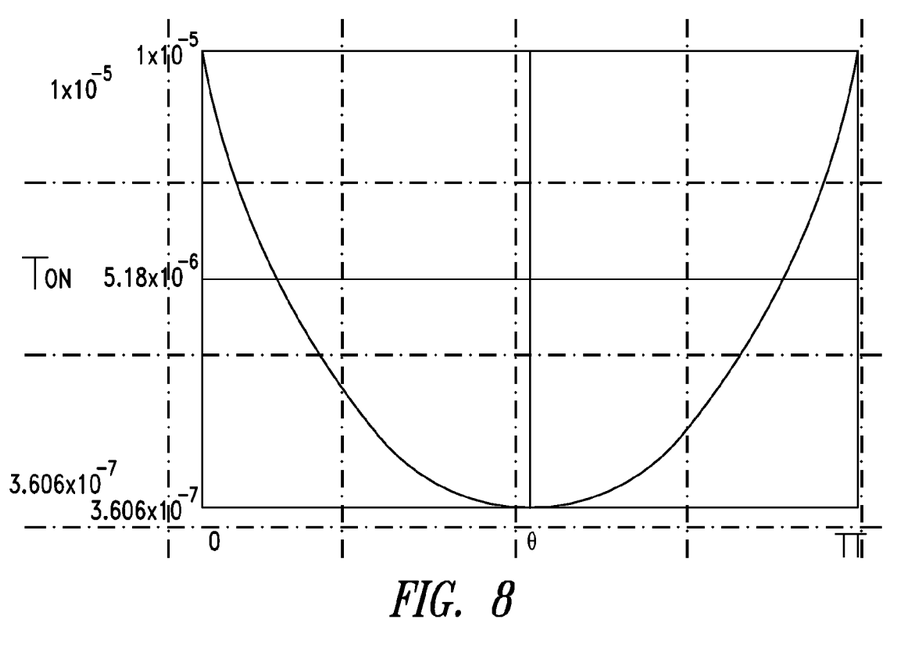
FIG. 8 depicts an exemplary characteristic of adjustment of the on-time duration in function of the line angle during a half-cycle of the input voltage.

The duration of the on-time interval may be constant, as in the PFC of FIG. 3. This result in a variable switching frequency operation with line conduction angle. According to an alternative embodiment shown in FIG. 7, the on-time duration may be adjustable according to the levels of the rectified input voltage VIN and of the output voltage VOUT sensed during a present switching cycle. In this case the ON time generator 42A is configured to receive in input the rectified input voltage VIN and the output voltage VOUT. For example, the on-time duration may be adjusted according to the line conduction angle as depicted in FIG. 8 in order to obtain a nearly constant fixed-frequency operation.

Figure 9:
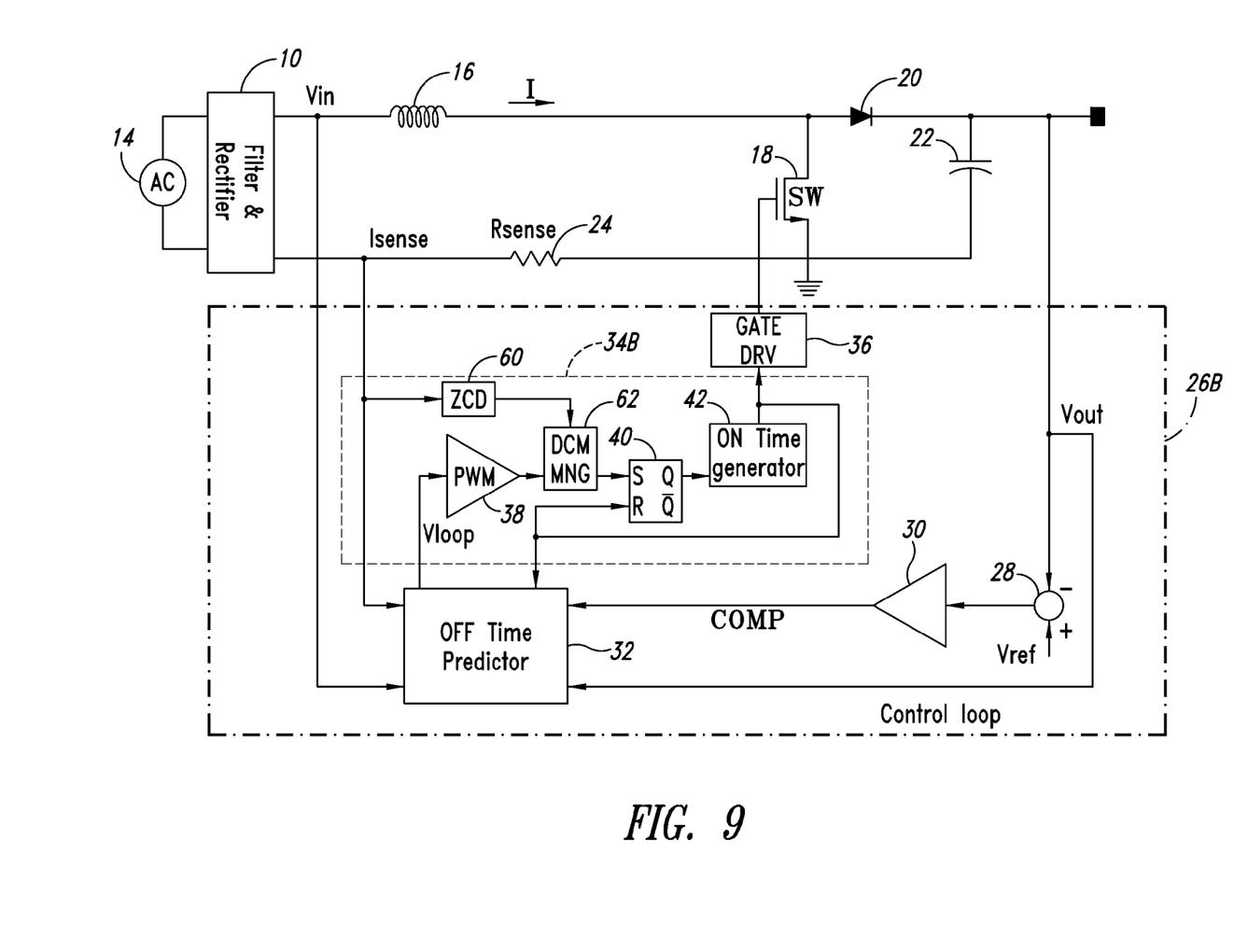
FIG. 9 shows another embodiment of a PFC with a closed-loop control circuit according to the present disclosure including functional blocks for managing a DCM functioning.
Figure 10:
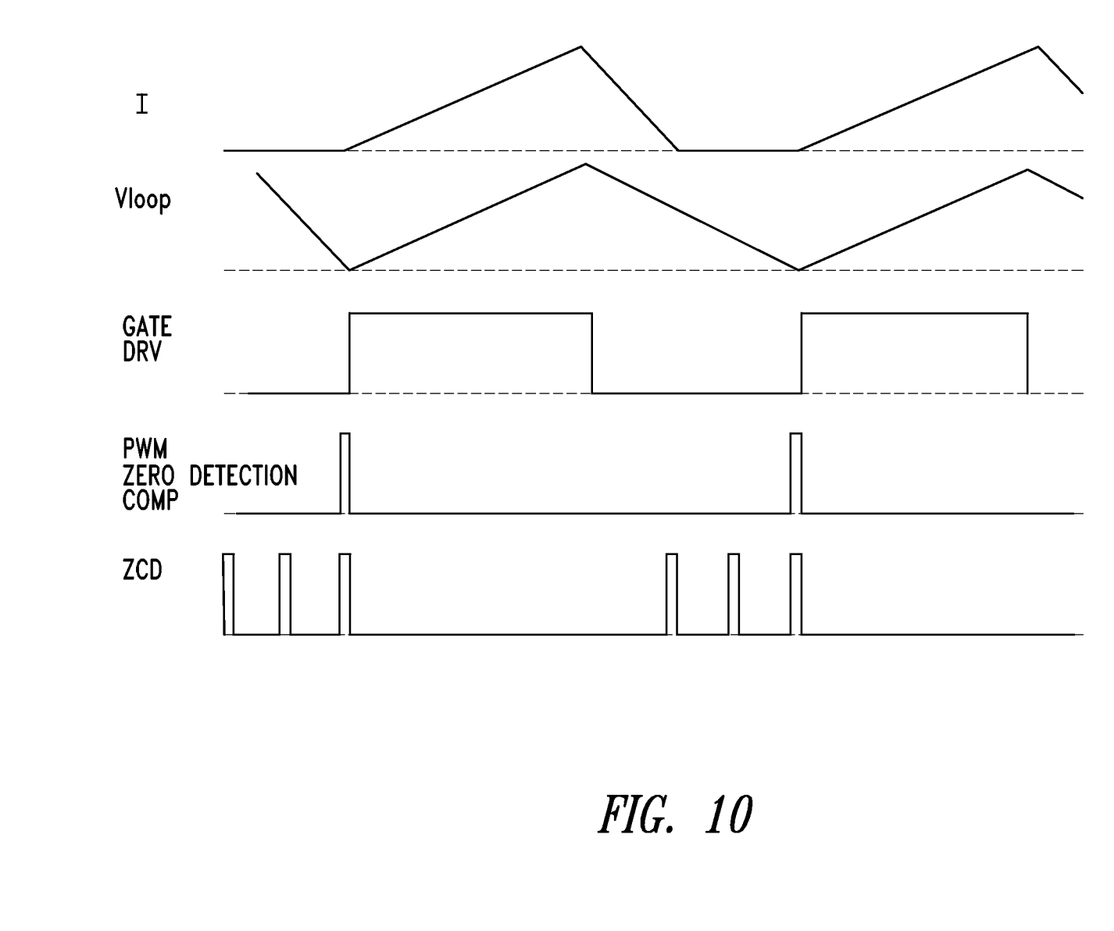
FIG. 10 depicts a time graph of the main signals of the PFC of FIG. 9 with the sub-circuit of FIG. 4 in DCM operating conditions. The load condition information can be used to determine the on-time duration.

An alternate closed-loop control circuit 26B of this disclosure may be equipped with means for managing a DCM functioning mode, as shown in the embodiment of FIG. 9. The control circuit 26B includes a PWM 34B according to a second embodiment. A zero current detection block (ZCD) 60 is added to the PWM 34B for implementing the so-called "valley skipping mode" in DCM operating condition, illustrated by the exemplary time graphs depicted in FIG. 10. The zero current detection block 60 receives in input the sense signal Isense and provides pulses to a DCM managing circuit 62 when the inductor current I is null. In this case, the switch 18 is not turned on even if the inductor current I is null and thus the charge voltage $V_{LOOP}$ does not replicate the waveform of the inductor current I during the off-time interval. Only when the charge voltage $V_{LOOP}$ nullifies, the PWM zero-detection comparator 38 issues a pulse to the DCM managing circuit 62, that on its turn sets the SR flip-flop 42. According to this implementation, the off-time modulation in DCM condition is still managed by means of the proposed charge/discharge mechanism implemented by the OFF time predictor 32 without any discontinuity between CCM and DCM operation Since the proposed methodology features the automatic reduction of switching frequency at light load, it is possible to attain a high efficiency even at low load conditions and also when a discontinuous current mode (DCM) control is implemented.

An improved efficiency at low power P (when controlling in DCM) and similar performances at high power (when controlling in CCM) are obtained with a PFC according to this disclosure.

The control circuit of this disclosure is intrinsically capable of reducing the switching frequency of the switch when the load decreases, thus automatically increasing the system efficiency.

Substantially the control circuit of this disclosure is an analog device that implements a predictive control, because the off-time for the next switching cycle is estimated in function of the sensed current through the inductor and depending on the difference between the voltage Vout and the input voltage Vin. Continuous Conduction Mode operation is obtained with a single loop architecture. The loop is closed using fully integrated analog components, thus it may be realized with low cost components.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for controlling a switching power factor corrector that includes input terminals configured to receive a rectified input voltage, output terminals configured to provide a regulated output voltage, a switched network including an inductor and a power switch coupled to said input terminals and to said output terminals, and a sensing circuit configured to generate a current sense signal representing a current through the inductor during on-time intervals of the power switch, said control circuit comprising:

a charge current generator circuit configured to generate a charge current as a replica of a current sense signal amplified with a gain corresponding to a square of a peak value of a rectified input voltage, a loop capacitor configured to be charged with said charge current during the on-time intervals and to be discharged with a discharge current during off-time intervals of the power switch, a discharge current generator circuit configured to be coupled to said loop capacitor during the off-time intervals and generate said discharge current proportional to a product of a comparison voltage and a difference between the regulated output voltage and the rectified input voltage, and a PWM modulator configured to sense a charge voltage of said loop capacitor, turn on said power switch for an on-time duration in response to detecting that said charge voltage nullifies, and turn off said power switch when said on-time duration has elapsed.

2. The control circuit of claim 1, wherein said discharge current generator circuit comprises:

a peak detector configured to receive said rectified input voltage, and a transconductance amplifier having an adjustable gain configured to be controlled by said peak detector, the transconductance amplifier being configured to generate said charge current based on the current sense signal.

3. The control circuit of claim 1, wherein said discharge current generator comprises:

an error amplifier configured to generate said comparison voltage as a signal proportional to a difference between a reference voltage and said regulated output voltage, a subtractor configured to generate a voltage representing the difference between said regulated output voltage and the rectified input voltage, and a multiplier coupled to the error amplifier and said adder, and configured to generate said discharge current.

4. The control circuit of claim 1, wherein said PWM modulator comprises:

a comparator configured to receive in input the charge voltage and generate a triggering pulse in response to detecting that the charge voltage nullifies to signal an end of one of the OFF time intervals, a monostable generator configured to generate a timing signal, kept in a high logic state for an on-time interval duration, in response to being enabled by the triggering pulse, and a driver configured to close the power switch in response to said timing signal being in the high logic state.

5. The control circuit of claim 4, wherein said monostable generator is configured to receive in input said regulated output voltage and the rectified input voltage, and to adjust said on-time interval duration according to a present line conduction angle of the rectified input voltage and of the regulated output voltage.

6. The control circuit of claim 4, wherein said PWM modulator further comprises:

a zero current detector configured to receive in input said current sense signal and to generate a zero-detection pulse at each switching cycle of the switch in response to detecting the current sense signal is null;

a discontinuous current mode managing circuit configured to receive in input each zero-detection pulse and said triggering pulse, configured to enable said monostable generator when said triggering pulse is received when the current sense signal is null.

7. A switching power factor corrector, comprising:
input terminals configured to receive a rectified input voltage;
output terminals configured to make available a regulated output voltage;
a switched network including an inductor and a power switch coupled to said input terminals and to said output terminals, the power switching being configured to, during switching cycles, couple said inductor in an energization path during on-time intervals in which said power switch is in an on state and couple the inductor in a discharge path during off-time intervals in which said power switch is in an off state;
a sensing circuit configured to generate a current sense signal representing a current flowing throughout said inductor during said on-time intervals; and
a control circuit that includes:
  a charge current generator circuit configured to generate a charge current as a replica of a current sense signal amplified with a gain corresponding to a square of a peak value of a rectified input voltage,
  a loop capacitor configured to be charged with said charge current during the on-time intervals and to be discharged with a discharge current during off-time intervals of the power switch,
  a discharge current generator circuit configured to be coupled to said loop capacitor during the off-time intervals and generate said discharge current proportional to a product of a comparison voltage and a difference between the regulated output voltage and the rectified input voltage, and
  a PWM modulator configured to sense a charge voltage of said loop capacitor, turn on said power switch for an on-time duration in response to detecting that said charge voltage nullifies, and turn off said power switch when said on-time duration has elapsed.

8. The switching power factor corrector of claim 7, wherein said discharge current generator circuit comprises:
a peak detector configured to receive said rectified input voltage, and
a transconductance amplifier having an adjustable gain configured to be controlled by said peak detector, the transconductance amplifier being configured to generate said charge current based on the current sense signal.

9. The switching power factor corrector of claim 7, wherein said discharge current generator comprises:
an error amplifier configured to generate said comparison voltage as a signal proportional to a difference between a reference voltage and said regulated output voltage,
a subtractor configured to generate a voltage representing the difference between said regulated output voltage and the rectified input voltage, and
a multiplier coupled to the error amplifier and said adder, and configured to generate said discharge current.

10. The switching power factor corrector of claim 7, wherein said PWM modulator comprises:
a comparator configured to receive in input the charge voltage and generate a triggering pulse in response to detecting that the charge voltage nullifies to signal an end of one of the OFF time intervals,
a monostable generator configured to generate a timing signal, kept in a high logic state for an on-time interval duration, in response to being enabled by the triggering pulse, and
a driver configured to close the power switch in response to said timing signal being in the high logic state.

11. The switching power factor corrector of claim 10, wherein said monostable generator is configured to receive in input said regulated output voltage and the rectified input voltage, and to adjust said on-time interval duration according to a present line conduction angle of the rectified input voltage and of the regulated output voltage.

12. The switching power factor corrector of claim 10, wherein said PWM modulator further comprises:
a zero current detector configured to receive in input said current sense signal and to generate a zero-detection pulse at each switching cycle of the switch in response to detecting the current sense signal is null;
a discontinuous current mode managing circuit configured to receive in input each zero-detection pulse and said triggering pulse, configured to enable said monostable generator when said triggering pulse is received when the current sense signal is null.

13. An AC/DC switching converter, comprising:
an input filtering and rectification stage having connection terminals configured to receive a mains voltage and generate a rectified input voltage; and
a switching power factor corrector that includes:
  input terminals configured to receive a rectified input voltage;
  output terminals configured to make available a regulated output voltage;
  a switched network including an inductor and a power switch coupled to said input terminals and to said output terminals, the power switching being configured to, during switching cycles, couple said inductor in an energization path during on-time intervals in which said power switch is in an on state and couple the inductor in a discharge path during off-time intervals in which said power switch is in an off state;
  a sensing circuit configured to generate a current sense signal representing a current flowing throughout said inductor during said on-time intervals; and
  a control circuit that includes:
    a charge current generator circuit configured to generate a charge current as a replica of a current sense signal amplified with a gain corresponding to a square of a peak value of a rectified input voltage,
    a loop capacitor configured to be charged with said charge current during the on-time intervals and to be discharged with a discharge current during off-time intervals of the power switch,
    a discharge current generator circuit configured to be coupled to said loop capacitor during the off-time intervals and generate said discharge current proportional to a product of a comparison voltage and a difference between the regulated output voltage and the rectified input voltage, and
    a PWM modulator configured to sense a charge voltage of said loop capacitor, turn on said power switch for an on-time duration in response to detecting that said charge voltage nullifies, and turn off said power switch when said on-time duration has elapsed.

14. The AC/DC switching converter of claim 13, wherein said discharge current generator circuit comprises:
a peak detector configured to receive said rectified input voltage, and
a transconductance amplifier having an adjustable gain configured to be controlled by said peak detector, the transconductance amplifier being configured to generate said charge current based on the current sense signal.

15. The AC/DC switching converter of claim 13, wherein said discharge current generator comprises:
an error amplifier configured to generate said comparison voltage as a signal proportional to a difference between a reference voltage and said regulated output voltage,
a subtractor configured to generate a voltage representing the difference between said regulated output voltage and the rectified input voltage, and
a multiplier coupled to the error amplifier and said adder, and configured to generate said discharge current.

16. The AC/DC switching converter of claim 13, wherein said PWM modulator comprises:
a comparator configured to receive in input the charge voltage and generate a triggering pulse in response to detecting that the charge voltage nullifies to signal an end of one of the OFF time intervals,
a monostable generator configured to generate a timing signal, kept in a high logic state for an on-time interval duration, in response to being enabled by the triggering pulse, and
a driver configured to close the power switch in response to said timing signal being in the high logic state.

17. The AC/DC switching converter of claim 16, wherein said monostable generator is configured to receive in input said regulated output voltage and the rectified input voltage, and to adjust said on-time interval duration according to a present line conduction angle of the rectified input voltage and of the regulated output voltage.

18. The AC/DC switching converter of claim 16, wherein said PWM modulator further comprises:
a zero current detector configured to receive in input said current sense signal and to generate a zero-detection pulse at each switching cycle of the switch in response to detecting the current sense signal is null;
a discontinuous current mode managing circuit configured to receive in input each zero-detection pulse and said triggering pulse, configured to enable said monostable generator when said triggering pulse is received when the current sense signal is null.

19. A method of controlling a switching power factor corrector that receives a rectified input voltage and provides a regulated output voltage, the method comprising:
setting durations of on-time intervals and of off-time intervals of a power switch of the switching power factor corrector, the setting including:
generating a charge current as a replica of a current sense signal, which is based on a current flowing through an inductor of the switching power factor corrector, amplified with a gain corresponding to a square of a peak value of the rectified input voltage;
charging a loop capacitor with said charge current during the on-time intervals and discharging the loop capacitor during the off-time intervals with a discharge current proportional to a product of a value of a comparison voltage and a difference between the regulated output voltage and the rectified input voltage;
turning on said power switch for an on-time duration in response to detecting that a charge voltage of the loop capacitor nullifies; and
turning off said power switch when said on-time duration has elapsed and until detecting that said charge voltage has nullified.

20. The method of claim 19, comprising:
sensing a sensed value of the rectified input voltage during a previous switching cycle; and
setting said on-time based on the sensed value of the rectified input voltage and said regulated output voltage.

21. The method of claim 19, comprising controlling the switching power factor corrector in discontinuous current mode, the controlling including:
generating a zero-detection pulse at each switching cycle whilst said current sense signal is null;
turning on said power switch in response to the charge voltage of the loop capacitor becoming null and said zero-detection pulse being generated.

\* \* \* \* \*